(12) United States Patent
Bhargava et al.

(10) Patent No.: US 9,641,530 B2
(45) Date of Patent: May 2, 2017

(54) INTEGRATED HOSTED DIRECTORY

(71) Applicant: JumpCloud, Inc., Boulder, CO (US)

(72) Inventors: Rajat Bhargava, Boulder, CO (US);
James Brown, Broomfield, CO (US);
Christopher Marie, Boulder, CO (US)

(73) Assignee: JumpCloud, Inc., Boulder, CO (US)

( * ) Notice: Subject to any disclaimer, the term of this patent is extended or adjusted under 35 U.S.C. 154(b) by 0 days.

(21) Appl. No.: 14/728,511

(22) Filed: Jun. 2, 2015

(65) Prior Publication Data

US 2016/0359854 A1 Dec. 8, 2016

(51) Int. Cl.
*H04L 29/06* (2006.01)
*G06Q 10/10* (2012.01)
*G06F 21/31* (2013.01)

(52) U.S. Cl.
CPC .......... *H04L 63/0884* (2013.01); *G06F 21/31* (2013.01); *G06Q 10/10* (2013.01); *H04L 63/0807* (2013.01); *H04L 63/0815* (2013.01)

(58) Field of Classification Search
CPC ............ H04L 63/0884; H04L 63/0807; H04L 63/0815; G06Q 10/10; G06F 21/31
USPC .......................................................... 726/8
See application file for complete search history.

(56) References Cited

U.S. PATENT DOCUMENTS

| | | | |
|---|---|---|---|
| 6,880,156 B1* | 4/2005 | Landherr | G06F 9/5083 709/229 |
| 7,181,523 B2* | 2/2007 | Sim | G06F 17/30194 707/E17.01 |
| 2013/0133043 A1* | 5/2013 | Barkie | H04L 63/10 726/4 |
| 2014/0108474 A1* | 4/2014 | David | G06F 17/30 707/827 |
| 2014/0173694 A1* | 6/2014 | Kranz | G06F 21/606 726/4 |

OTHER PUBLICATIONS

"LDAP Sync Replication", OpenLDAP, "www.openldap.org/doc/admin22/syncrepl.html", published May 2, 2014, retrieved from archive.org Sep. 20, 2015.*

* cited by examiner

*Primary Examiner* — John B King
(74) *Attorney, Agent, or Firm* — Holland & Hart LLP

(57) ABSTRACT

Methods, systems, and devices for enterprise-wide management of disparate devices, applications, and users are described. A cloud-based central server may maintain an integrated hosted directory, which may allow user authentication, authorization, and management of information technology (IT) resources across device types, operating systems, and software-as-a-service (SaaS) and on-premises applications. IT resources for multiple and separate customers may be managed from a single, central directory, and servers may be brought online to allow access to the directory according to system loading.

20 Claims, 10 Drawing Sheets

INTEGRATED HOSTED DIRECTORY

BACKGROUND

Information technology (IT) and networking is increasingly leveraging remote servers and disparate resources. Organizations often rely on internet-based IT infrastructures to serve employees and clients who may be located around the globe. A single enterprise may utilize devices (including laptops, desktops, phones, tablets, printers, etc.) located on premise, within remote data centers, and hosted at remote, third-party owned servers ("the cloud"). Consequently, managing IT infrastructure has become time consuming, labor intensive, and tedious. Additionally, many organizations are relying on a software-as-a-service (SaaS) based model for applications, content, and the like; and such this SaaS-based model does not lend itself to traditional on-premises management.

While the trend toward cloud and SaaS-based infrastructure has been effective on many fronts, it has introduced a number of challenges related to system administration and user authentication. The disparate nature of servers, devices, applications, and users has given rise to increased networking complexity, security concerns, and poor interoperability of resources. A central means of managing cloud and SaaS resources, and authenticating users for those resources may thus increase the efficiency and productivity of cloud-based IT infrastructure.

SUMMARY

Methods, systems, and devices that support a central directory for enterprise-wide management of disparate devices, applications, and users are described. Within a networked, cloud-based computing system, a central server may maintain an integrated hosted directory, which may allow user authentication, authorization, and management of IT resources across devices types, operating systems, and SaaS and on-premises applications. Portions of the directory may be shared with or mirrored on various cloud-based and on-premises servers to increase access and usability by system administrators. Furthermore, IT resources for multiple separate customers may be managed from a single, central directory, and servers may be brought online to allow access to the directory according to system loading.

A method of multitenant directory management is described. The method may include: accessing a directory at a central server, and the directory comprises IT resources for a plurality of customers; activating a first edge server of a plurality of edge servers; transmitting a first portion of the directory from the central server to the first edge server, and the first portion of the directory may include IT resources for a first customer of the plurality of customers; transmitting a second portion of the directory from the central server to the first edge server, and the second portion of the directory may include IT resources for a second customer of the plurality of customers; activating a second edge server of the plurality of edge servers based at least in part on a system load from the plurality of customers; transmitting the first and second portions of the directory to the second edge server; and authenticating a first user for access to the first portion of the directory at the first and second edge servers utilizing a first protocol.

A system for multitenant directory management is also described. The system may include a central server, which may include a directory or IT resources for a plurality of customers, a directory server that supports access to the directory using a first protocol, a console server in communication with the directory server, where the console server may provide a user interface for web-based access to the directory, and an agent server in electronic communication with the directory server and the console server, where the agent server may control server agents located on remote devices and may support agent access to the directory. The system may also include: a first edge server in electronic communication with the directory server, and the first edge server may support access to the directory using the first protocol, and may host a first portion of the directory for a first customer of the plurality of customers and a second portion of the directory for a second customer of the plurality of customers; a second edge server in electronic communication with the directory server and operable to activate if a system load from the plurality of customers is greater than a first threshold and to deactivate if the system load from the plurality of customers is less than a second threshold, where the second edge server may support access to the directory using the first protocol, and the second edge server may host the first portion of the directory for the first customer or the second portion of the directory for the second customer, or both; and an authentication server in electronic communication with the central server, where the authentication server may authenticate users from the plurality of customers for access to the first or second portions of the directory using a second protocol that is different from the first protocol.

A central server for multitenant directory management is also described. The central server may include a processor, memory in electronic communication with the processor, and instructions stored in the memory and operable when executed by the processor to cause the central server to: access a directory of IT resources for a plurality of customers; transmit a first portion of the directory to a first edge server, where the first portion of the directory may include IT resources for a first customer of the plurality of customers; transmit a second portion of the directory to the first edge server, where the second portion of the directory may include IT resources for a second customer of the plurality of customers; transmit the first portion or second portion of the directory to a second edge server, where the second edge server may be operable to activate if a system load from the plurality of customers is greater than a first threshold and to deactivate if the system load from the plurality of customers is less than a second threshold; authenticate a first user for access to the first portion of the directory at the first or second edge server base at least in part on a request received from the first or second edge server; and authenticate a second user for access to the second portion of the directory at the first edge server based at least in part on a request received from the first edge server.

BRIEF DESCRIPTION OF THE DRAWINGS

Aspects of the disclosure are described in reference to the following figures.

DETAILED DESCRIPTION

A central directory for enterprise-wide management of disparate devices, applications, and users may allow IT system administrators to authenticate users across device types, operating systems, on-premises applications, or SaaS-based applications. For instance, users (e.g., organizational employees), devices, and applications may be populated into a central store via a web-based console. Permissions may be assigned for all IT resources (e.g., devices, applications, file systems, files, etc.) within consoles, such that once populated, the system administrator may readily manage users and IT resources from a single location. The console may also allow users to manage, through a self-service portal, certain functions—like password resets, profiles, and certificate-based keys—to IT resources to which those users have permissions. The integrated hosted directory may thus reduce management complexity.

Additionally, a single directory may host resources for several different organizations. Unlike traditional or pre-cloud directories, the integrated hosted directory described herein may provide for management of IT resources and users from different customers (e.g., enterprises). This multitenant directory management may allow for selective administration and permission granting between customers. That is, users from one customer may be granted permission to devices, applications, files, and the like, of other customers, providing a simple, seamless way of managing IT resources across organizations.

Aspects of the disclosure are initially described below in the context of a system that supports multitenant directory management. Various examples of an integrated hosted directory and web-based console are then described. These and other aspects of the disclosure are further illustrated by and described with reference to apparatus diagrams, system diagrams, and flowcharts that relate to multitenant directory management.

Figure 1:
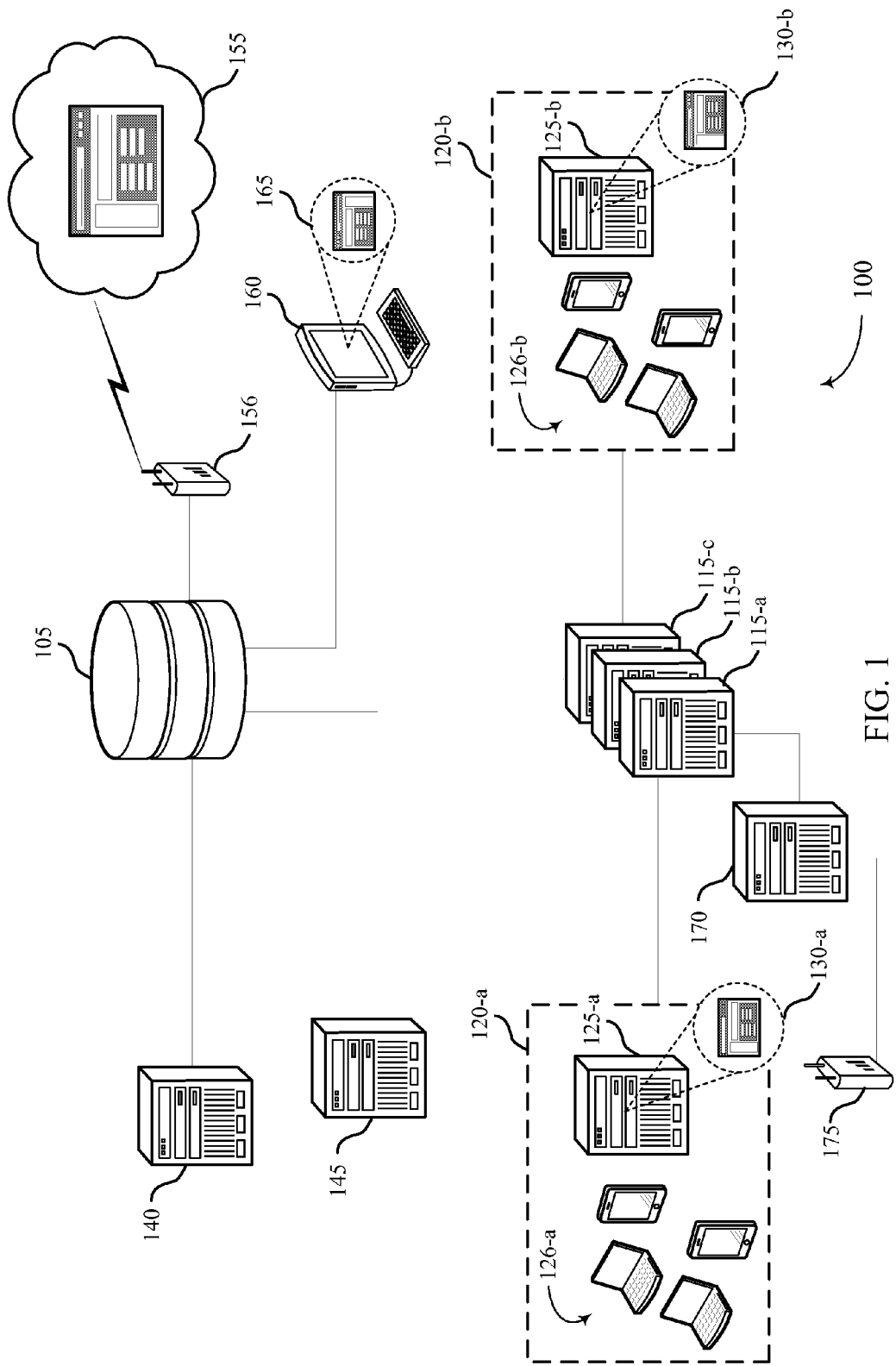
FIG. 1 illustrates an exemplary system that supports multitenant directory management in accordance with various aspects of the present disclosure.

FIG. 1 illustrates an exemplary system 100 that supports multitenant directory management in accordance with various aspects of the present disclosure. The system 100 includes a central server 105. The central server 105 may include a directory—such as the integrated hosted directory described herein—that may include IT resources for several different customers. An example of the directory is described in more detail with reference to FIG. 2. As used here, the term customer may refer to an enterprise or organization, rather than an individual. An individual member or element of a customer may be referred to as a user.

The central server 105 may include a directory server, which may host a directory, and which may support access to the directory using, e.g., a particular protocol. In some examples, the directory server supports access to the directory using Lightweight Directory Access Protocol (LDAP). The central server 105 may also include a console server, which may provide a user interface for web-based access to the directory. In some examples, the central server 105 also includes an agent server that controls server agents located on remote devices and may support agent access to the directory.

In some cases, the system 100 includes a number of edge servers 115. Edge servers 115 may be located physically near a customer and physically remote from the central server 105. Edge servers 115 may reflect replicated portions of the central server 105, but their location proximate to a customer may, as compared to an exclusively centralized system, reduce latency, reduce data transmission costs, increase quality of service (QoS), and the like. Moreover, edge servers 115 may be scalable, such that additional servers may be activated (e.g., "spun up") to accommodate and respond to increases in system loading.

For instance, portions of the directory housed on central server 105 may be reflected (e.g., transmitted) to edge server 115-a. Users may access the directory, or portion of the directory, at edge server 115-a utilizing the same protocol as they would to access the directory at the central server 105 (e.g., LDAP). If system loading, as experienced at edge server 115-a, exceeds a threshold, an additional edge server 115-b may be activated. For example, if a number of users attempting access exceeds a preset value or if latency reaches a particular threshold (e.g., a time delay, which may be on the order of tenths or tens of a second), edge server 115-b may be spun up. By way of example, system loading may be based on central processing unit (CPU) usage of edge server 115-a. If a threshold CPU usage exceeds a threshold (e.g., 80 percent of capacity), edge server 115-b may be activated. In other examples, a threshold may be based on memory usage, disk input/output (I/O), a number of customer request, or the like. In such cases, the portions of the directory reflected on edge server 115-a may also be reflected or transmitted to 115-b. If system loading falls below the threshold, or some other threshold value, edge server 115-b may be taken offline. Alternatively, if system loading continues to increase beyond a subsequent threshold, an additional edge server 115-c may be activated, and the portions of the directory may be reflected to it.

The system 100 may also support certain authentication, authorization, and management on the premises 120 of customers. For example, on-premises (or "on-prem") server 125-a, which may be physically located on the premises 120-a of a first customer, may include a replica module 130-a. Replica module 130-a may host a portion of the directory with IT resources of, accessible to, or managed by the first customer. That is, a portion of the directory hosted on central server 105 may be reflected to replica module 130-a. This may be via an edge server 115, in some cases. The devices 126-a may thus, in some examples, be managed by and may be included in the portion of the directory hosted by replica module 130-a. Additionally or alternatively, the devices 126-a may include computing devices of various types (e.g., mobile phones, tablets, notebook computers, desktop computers, servers, etc.), which may utilize various operating systems. Replica module 130-a may thus provide a familiar, local version of the directory, which may be securely maintained and readily accessed by the first customer. As used herein, on-premises may refer to a server, device, or the like that is within the control of the customer. In some cases, this may include servers located in a remote data center owned or controlled by the customer, which may be contrasted with servers maintained or controlled by a third-party and accessible to the customer via the internet (e.g., cloud servers).

Additionally, on-premises server 125-*b*, which may be physically located on the premises 120-*b* of a second customer, may include a replica module 130-*b*. Replica module 130-*b* may host a portion of the directory with IT resources of, accessible to, or managed by the second customer. Similar to replica module 130-*a*, a portion of the directory hosted on central server 105 may be reflected to replica module 130-*b*. But these portions may be different (e.g., include different users, IT resources, etc.). The devices 126-*b* may be managed by and may be included in the portion of the directory hosted by replica module 130-*b*. Additionally or alternatively, the devices 126-*b* may include computing devices of various types (e.g., mobile phones, tablets, notebook computers, desktop computers, servers, etc.), which may utilize various operating systems In some cases, system 100 includes a single-sign-on (SSO) server 140. The SSO server 140 may provide access to, or may be represented in the directory. The SSO server 140 may facilitate assertion of a user's identity to a third party using, for instance, an authentication protocol, such as Security Markup Language (SAML), OpenID, OAuth, or the like. Thus, users who have been authenticated at the central server 105 (or an edge server 115, replica module 130, etc.) may gain access to third-party applications, websites, content, or the like, without the necessity of an additional credentialing process. That is, a user authorized by the system 100 may avoid entering login credentials with certain trusted and trusting third parties. In some cases, the SSO server 140 may facilitate access to the central server 105, thus the directory hosted there, without the necessity of further user authentication. For instance, a user authenticated by a trusted third party may gain access to the central server without the necessity of further credentialing.

In some examples, system 100 includes a separate authentication server 145. The authentication server 145 may authenticate users from various customers to the central server 105. For example, a user may access the authentication server with a device, and may authenticate with the authentication server 145. This may involve the user entering a username and password. This authentication process may include the authentication server 145 exchanging a ticket or key with a device of the user. The user may then access the central server 105 or an edge server 115, for instance, based on the authentication with the authentication server 145, which may include the user's device exchanging the ticket or key. In some examples, the authentication server 145 utilizes Kerberos to facilitate authentication. In some examples, the central server 105 or edge servers 115 may also employ Kerberos.

As mentioned above, aspects of the system 100 may be accessible by and managed through a web-based console 155. The console may include or be a user interface that provides access to maintain a directory, or portions of the directory, hosted on central server 105. As depicted in the example of FIG. 1, the console 155 may provide remote access to the central server 105 via an Internet connection and, for instance, a wireless access point 156. Those skilled in the art will recognize, however, that because central server 105 may be a cloud server, remote access to central server 105 may be achieved in a variety of ways. As discussed in further detail with reference to FIG. 3, the console 155 may allow an IT system administrator to manage user permissions, monitor access to various applications or files, and the like. The console 155 may be or employ a representational state transfer (REST) application programmer interface (API). The REST API may be used to search a directory, query the directory, or provision users for access to the directory via the console 155. Additionally or alternatively, the REST API may be used for authentication to the directory via the console 155.

The system 100 may, in some cases, include access by a device 160 hosting a server agent 165. The device 160 may be any type of computing device, including a server. Server agent 165 may be a software module (e.g., computer- or processor-executable code) that is configured to run certain software on device 160. The server agent 165 may be equipped with various submodules, including those for caching tasks or schedules, storing or registering user encryption certificates, or processing and executing commands. In some examples, the server agent 165 is capable of executing any number of commands or tasks. For instance, the server agent 165 may perform server functions related to user management, disk space management, log monitoring, changing system configurations, sending and receiving emails, or identifying and neutralizing security threats. The central server 105 may allow the server agent 165 to access a directory upon receiving a command via console 155. In some examples, credentials may be pushed from the central server 105 to the server agent 165. The server agent 165 may be preconfigured to authenticate a user as though the user was directly accessing, or attempting to access, the directory itself. In such cases, when a user authenticates to a device (e.g., console 155) where the server agent 165 is hosted, the server agent 165 may accomplish the authentication independently, providing user access to the directory.

In certain examples, system 100 also includes a remote authentication server 170 in communication with an edge server 115. The remote authentication server 170 may authenticate guest users of virtual private network (VPN) users for access to the directory reflected at the edge server 115. For instance, remote authentication server 170 may provide access to a visiting user who connects to the system 100 via wireless access point 175. Additionally or alternatively, remote authentication server 170 may authenticate users from customers described above who are off premises, and are accessing the central server 105 via VPN. In some examples, remote authentication server 170 employs Remote Authentication Dial In User Server (RADIUS), or some other protocol that supports authentication, authorization, and accounting. In some examples, the central server 105 or edge servers 115 may also employ RADIUS.

The various elements, components, servers and devices of system 100 may be connected to one another wirelessly or with wired connections. In some cases, they are connected via the Internet. Communication between the various devices may utilize Transport Layer Security (TLS), Secure Sockets Layer (SSL), or some other security or encryption protocol. As used herein, the term server refers to a computer or program in a network that provides services, including access to applications, files, peripherals, etc., to other computers or programs, or consoles within a network. As discussed below, this may include both software and hardware, and real and virtual machines. In some examples, a server is a computer program that operates to support or perform tasks on behalf of other programs, computers, or users. Further, as used herein, a server may include a "rack" or enclosure housing computer hardware and software.

The system 100 may thus support multitenant directory management. This may be accomplished, in part, with an integrated hosted directory on central server 105, which may facilitate authentication, authorization, and management of IT resources across devices types, operating systems, and SaaS and on-premises applications.

Figure 2:
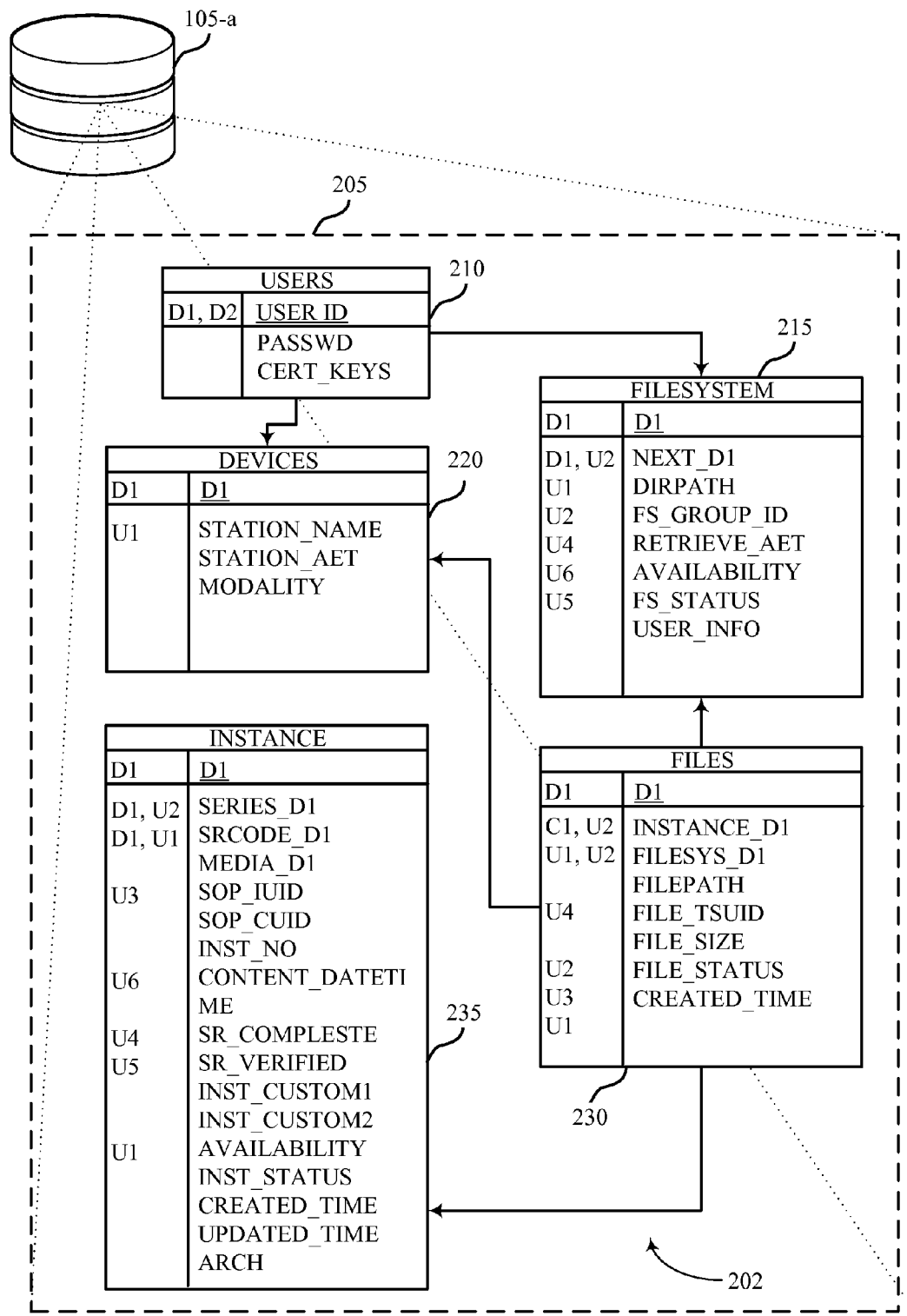
FIG. 2 illustrates an example of an integrated hosted directory in a system that supports multitenant directory management in accordance with various aspects of the present disclosure.

FIG. 2 illustrates an example 200 of an integrated hosted directory 202 in a system, such as system 100 of FIG. 1, that supports multitenant directory management in accordance with various aspects of the present disclosure. The directory 202 may be stored in a directory server (or directory server module) 205 of a central server 105-a, which may be an example of the central server 105 of FIG. 1. The directory 202 may be a system, such as a software system, that maps, organizes, and connects users to IT resources, including servers, devices, peripherals, applications, file systems, files, and the like. In some cases, the directory 202 may be referred to as a directory service. The directory 202 provides a system for allowing and maintaining records of which users are or should be allowed to access what IT resources, and whether, when, and by whom those IT resource were accessed.

The example of FIG. 2 illustrates one depiction of a directory 202. The directory 202 may include fields or modules representative of users 210 and IT resources, such as file system 215, devices 220, files 230, and instances 235. The directory 202 may thus include a reference or references to IT resources. Additionally or alternatively, the directory may be said to reference IT resources. For example, the users 210 may be users associated with one or several customers. The directory 202 may provide a mapping to a file system 215 (or file systems) to which users 210 have access. The file system 215 may, in some cases represent applications, such as SaaS applications. The users 210 may also be mapped to certain devices 220, which may be mapped to certain files 230 to which a user 210 or devices 220, or both, has permissions. The devices 220 may be representative of devices 126 of FIG. 1. The files 230 may be mapped to instances 235, which may provide details or information relevant to managing access by users 210.

The directory 202 includes an arbitrary set of fields and modules for purposes of illustration. Those skilled in the art will recognize that a directory may take on a number of forms and may include fields different from those illustrated here.

Figure 3:
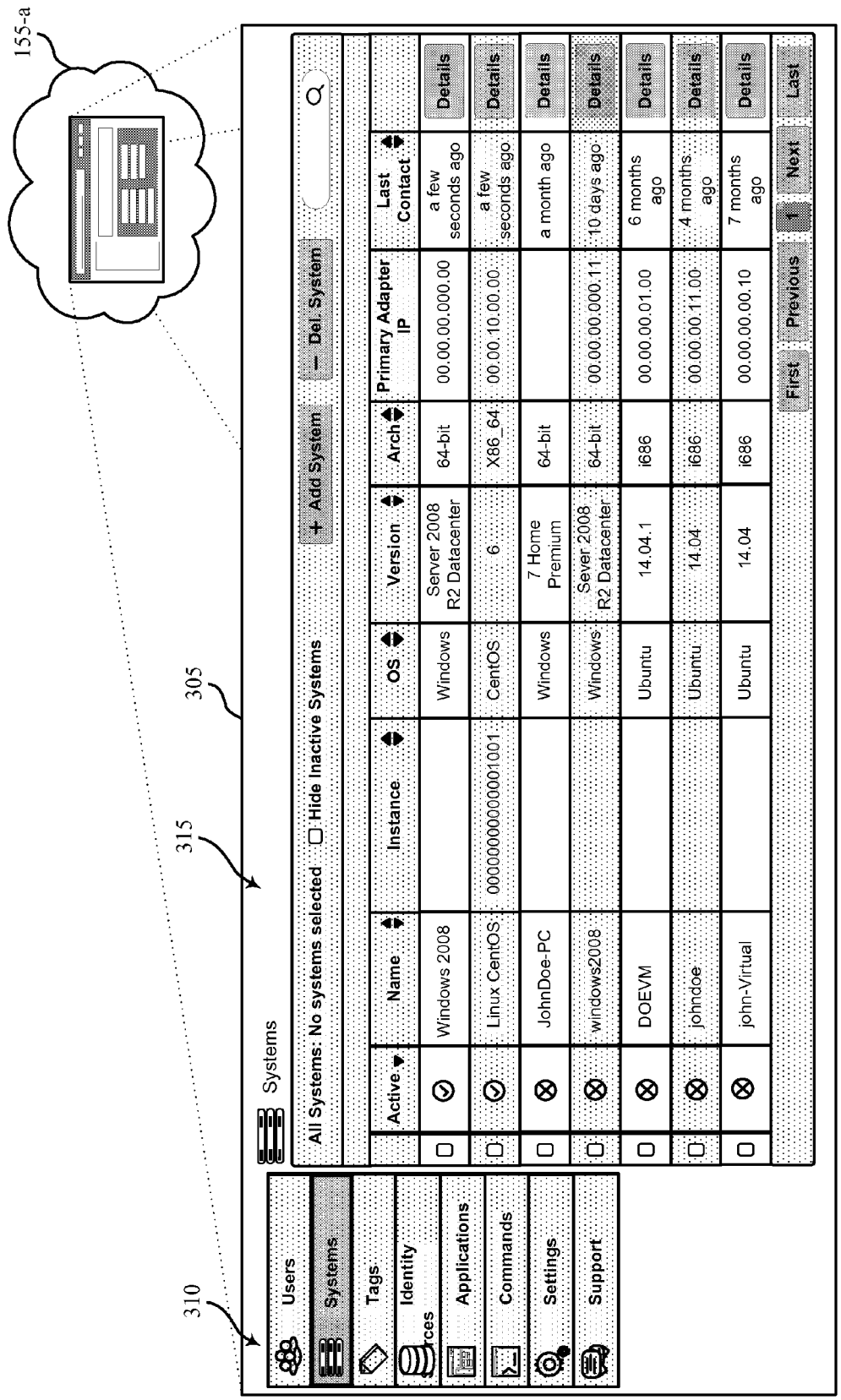
FIG. 3 illustrates an example of a web-based console in a system that supports multitenant directory management in accordance with various aspects of the present disclosure.

FIG. 3 illustrates an example 300 of a web-based console 155-a in a system, such as system 100 of FIG. 1, that supports multitenant directory management in accordance with various aspects of the present disclosure. The console 155-a may include a user interface (UI) 305, which may provide a portal for access to a directory, such as directory 202 of FIG. 2. The UI 305 may include fields 310, icons, and the like that allow a user to interact with the directory 202. The fields 310 may correspond or be associated with some or all of the IT resources (file system 215, device 220, files 230, and instances 235) of or referenced by the directory 202. That is, a system administrator may, for example, navigate, identify, and manage the mapping of users to IT resources via the UI 305.

The UI 305 may provide real-time information about user interactions with the directory via window 315. For instance, the window 315 may display information about a particular user's permissions to access various IT resources. In some cases, the window 315 may also provide information about current and historic uses of such IT resources. Various devices, applications, security issues, and the like, related to a particular user may thus be monitored and managed via UI 305.

Figure 4:
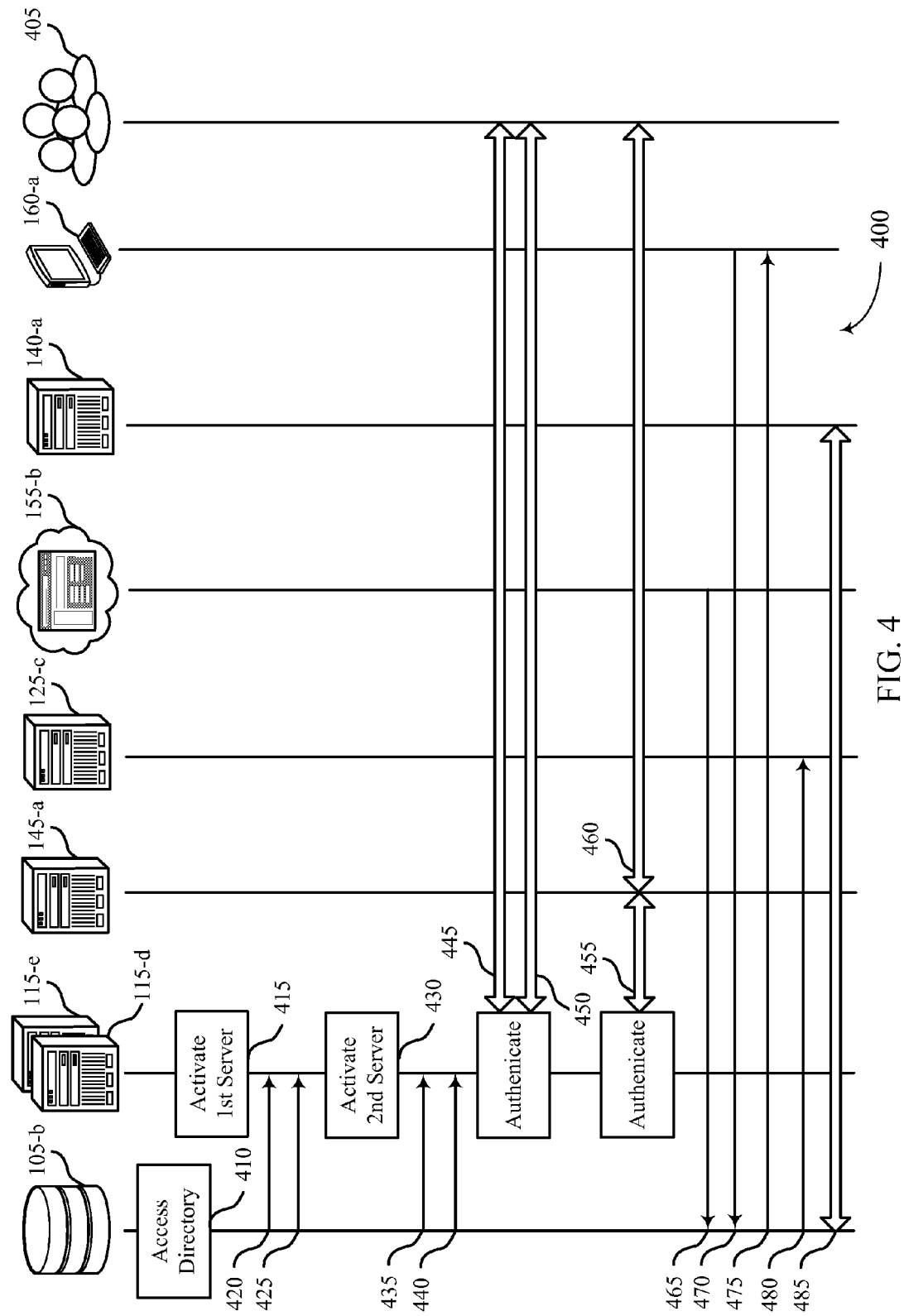
FIG. 4 illustrates an exemplary process flow in a system that supports multitenant directory management in accordance with various aspects of the present disclosure.

FIG. 4 illustrates an exemplary process flow 400 in a system, such as system 100 of FIG. 1, that supports multitenant directory management in accordance with various aspects of the present disclosure. The process flow 400 may include a central server 105-b, edge servers 115, an authentication server 145-a, on-premises server 125-c, console 155-b, SSO server 140-b, a remote (e.g., server-agent hosting) device 160-a, and users 405. Each of these may examples of corresponding devices, entities, and the like, described with reference to FIGS. 1-3.

At 410, a directory at a central server 105-b may be accessed. The directory may be as described with reference to FIG. 2, and may include IT resources for a plurality of customers, such as customers having users 405.

At 415, a first edge server 115-e may be activated and, at 420, a first portion of the directory may be transmitted from the central server 105-b to the first edge server 115-d. The first portion of the directory may include IT resources for a first customer of the plurality of customers. At 425, a second portion of the directory from the central server 105-b to the first edge server 115-d. The second portion of the directory may include IT resources for a second customer of the plurality of customers.

At 430, a second edge server may be activated based, for instance, on a system load from the plurality of customers. For instance, the system load may exceed a threshold, as described above with reference to FIG. 1. At 435 the first portion of the directory may be transmitted from the central server 105-b to the second edge server 115-e, and at 440 the second portion of the directory may be transmitted from the central server 105-b to the second edge server 115-e.

At 445, a first user 405 may be authenticated for access to the first portion of the directory at the first and second edge servers 115-d, 115-e utilizing a first protocol. The first user 405 may attempt to access a web-based application using a device, for example, and the directory may provide a mapping of that user's permission for such access. At 450, a second use 405 may be authenticated for access to the second portion of the directory at the first edge and second edge servers 115-d, 115-e utilizing the first protocol.

At 455, a third user 405 may be authenticated for access to the first or second portion of the directory utilizing a second protocol that is different from the first protocol. This may include, at 460, the third user 405 accessing a remote authentication server 145-a, which may communicate with an edge server 115 or the central server 105 to facilitate authentication. In some examples, the first protocol is LDAP and the second protocol is Kerberos.

At 465, the central server 105-b may identify a command received via web-based console 155-b and, at 470, the central server 105-b may receive a request for directory access from a server agent located on a remote device 160-a. The central server 105-b may, in response at 475, transmit data to the server agent on remote device 160-a in response to the request for directory access.

In some cases, at 480, the first portion of the directory may be transmitted from the first edge server 115-d to a portion of an on-premises server 125-c of the first customer. As described above, the on-premises server 125-c may include a replica module, which may be described as an LDAP sync replica or LDAP gateway, and which may be a copy of the first portion of the directory reflected at the on-premises server 125-c.

At 485, the central server 105-b may be in communication with the SSO server 140-a to support identity assertion to a third party on behalf of a customer of the plurality of customers. As described above, the identity assertion may be on the SSO server 140-b accessing the directory on the central server 105-b, and the SSO server 140-a may utilize at least one of SAML, OpenID, or OAuth.

Figure 5:
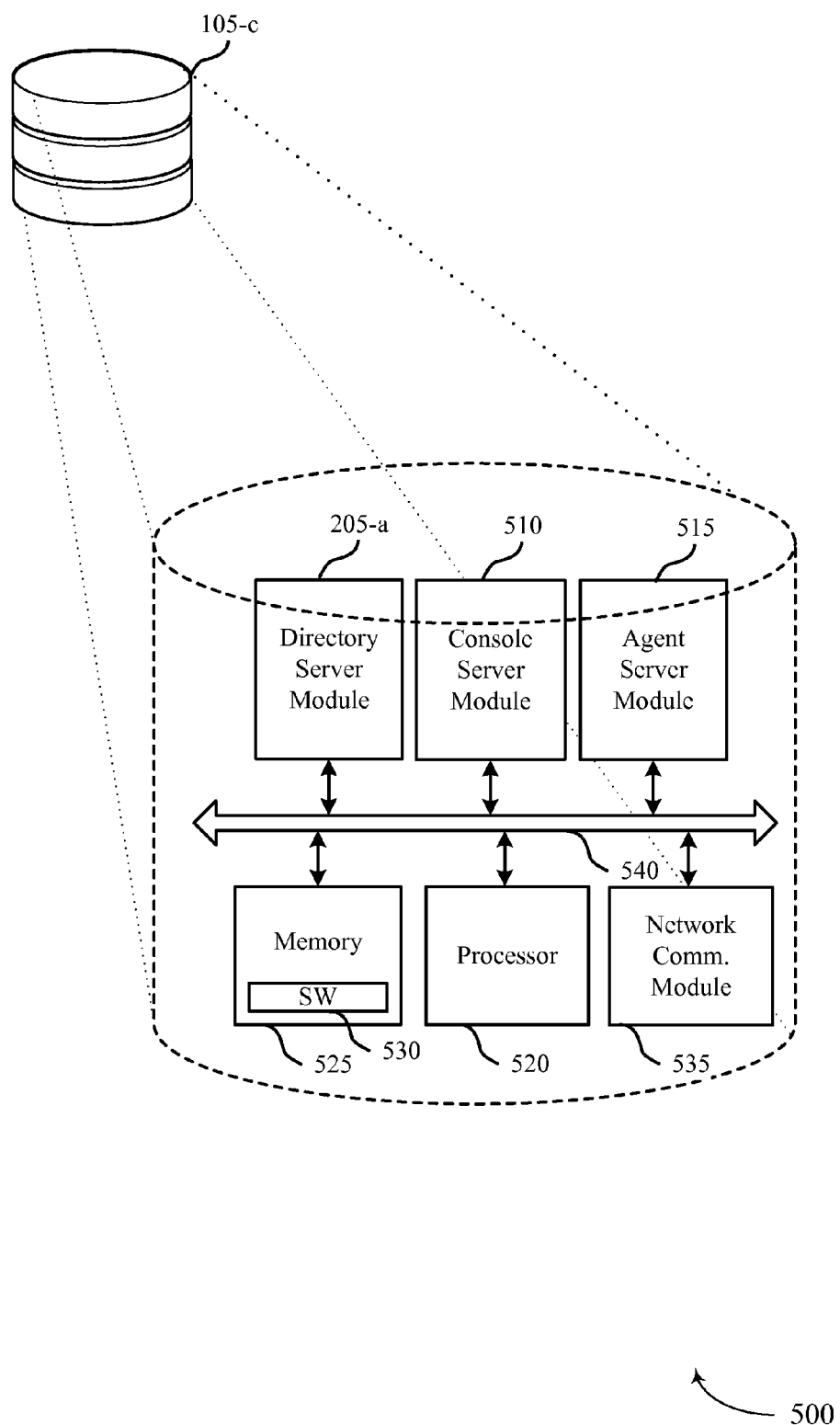
FIG. 5 illustrates an example of a central server that supports multitenant directory management in accordance with various aspects of the present disclosure.

FIG. 5 illustrates an example 500 of a central server 105-c that supports multitenant directory management in accordance with various aspects of the present disclosure. The central server 105-c may be an example of central server 105 described with reference to FIGS. 1-4, and may include a directory server module 205-a, a console server module 510, and an agent server module 515.

The directory server module 205-a may be an example of the directory server module 205 of FIG. 2 and may host a directory 202 (FIG. 2). Some or all of the directory may be accessible to other components of the central server 105-b. The directory server module 205-a may, in some cases and in combination with other components of the central server 105-c, access the directory, transmit portions of the directory, and authentication users for access to the directory, as described with reference to FIGS. 1 and 4.

The console server module 510 may, in combination with other components of the central server 105-c, identify a command received via a web-based console, as described with reference to FIGS. 1 and 4. In some cases, the console server module 510 facilitates the operations described with reference to FIG. 3.

The agent server module 515 may cause the central server 105-c receive a request for directory access from a server agent located on a remote device. In some cases, the agent server module 515, in combination with other components of the central server 105-c, may transmit data to the server agent in response to the request for directory access and based on the identified command, as described with reference to FIGS. 1 and 4.

The central server 105-c may include a processor 520, memory 525 (including software/firmware (SW) 530), and a network communications module 535. The various modules of the central server 105-c may be in communication via one or more buses 540. The network communications module 535 may be configured for secure, bi-directional communication with other devices, servers, and the like in a system, such as system 100 of FIG. 1, via one or more wired or wireless links. For example, the network communications module 535 may include a modem configured to modulate packets and transmit them to, and to demodulate received packets.

The memory 525 may include random access memory (RAM) and read only memory (ROM). The memory 525 may store computer-readable, computer-executable software/firmware code 530, including instructions that, when executed, cause the processor 520 to perform various functions described herein (e.g., facilitating multitenant directory management.). Alternatively, the software/firmware code 530 may not be directly executable by the processor 520 but cause a computer (e.g., when compiled and executed) to perform functions described herein. The processor 520 may include an intelligent hardware device, (e.g., a central processing unit (CPU), a microcontroller, an ASIC, etc.).

Figure 6:
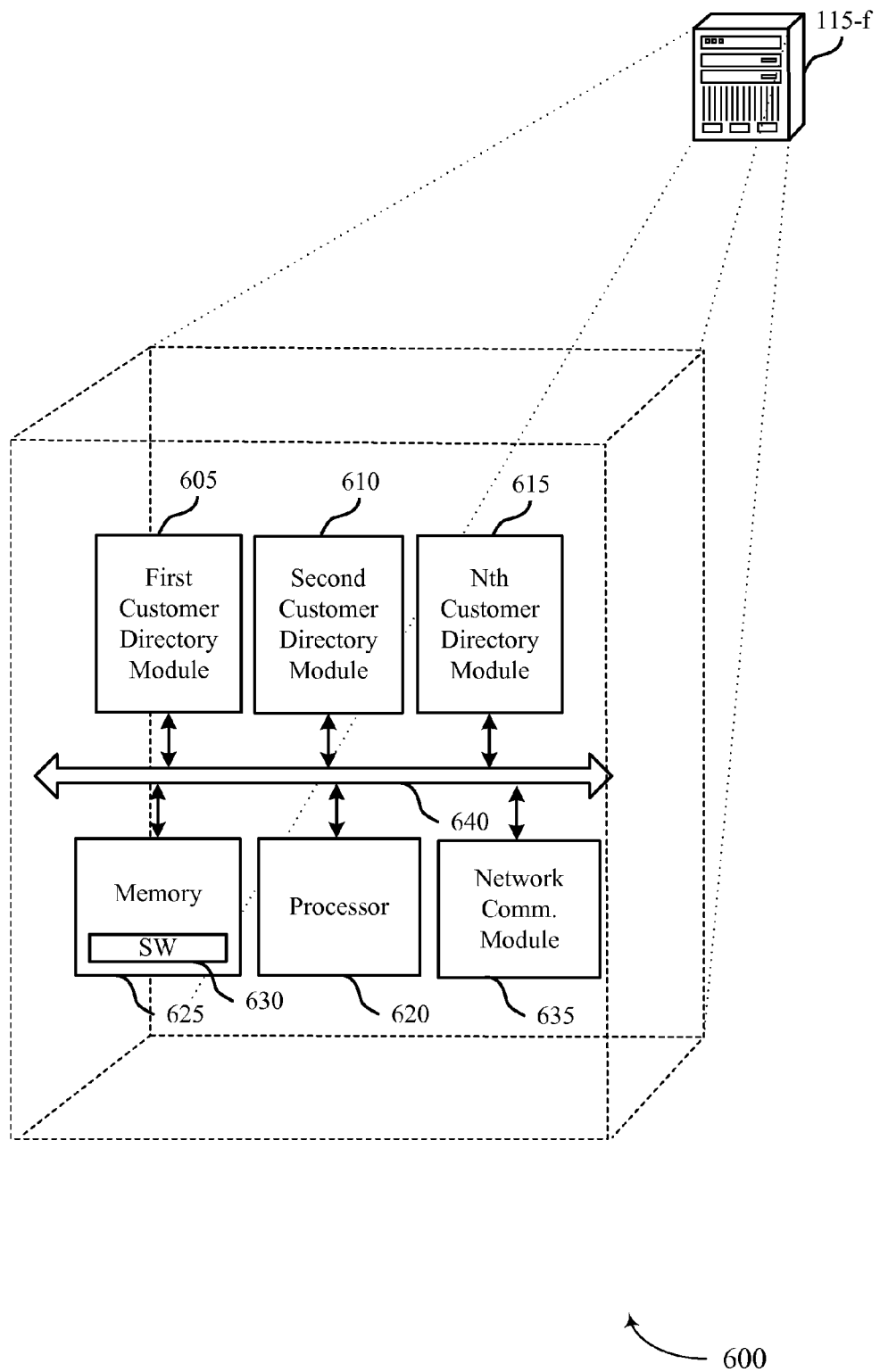
FIG. 6 illustrates an example of an edge server that supports multitenant directory management in accordance with various aspects of the present disclosure.

FIG. 6 illustrates an example 600 of an edge server 115-f that supports multitenant directory management in accordance with various aspects of the present disclosure. The edge server 115-f may be an example of an edge server 115 described with reference to FIGS. 1-4, and may include a first customer directory module 605, a second customer directory module 610, and an nth customer directory module 615.

The first customer directory module 605 and the second customer directory module 610 may receive, host, and provide authenticated access to first and second portions of a directory, respectively, from a central server 105, as described with reference to FIGS. 1-5. The preceding description has generally discussed a first and second portion of the directory for first and second customers. Additional customers may be supported by the directory (e.g., 202 of FIG. 2). Thus, in some cases, an nth customer directory module may receive, host, and provide authenticated access to an nth portion of the directory from a central server 105.

The edge server 115-f may include a processor 620, memory 625 (including software/firmware (SW) 630), and a network communications module 635. The various modules of the edge server 115-f may be in communication via one or more buses 640. The network communications module 635 may be configured for secure, bi-directional communication with other devices, servers, and the like in a system, such as system 100 of FIG. 1, via one or more wired or wireless links. For example, the network communications module 635 may include a modem configured to modulate packets and transmit them to, and to demodulate received packets.

The memory 625 may include random access memory (RAM) and read only memory (ROM). The memory 625 may store computer-readable, computer-executable software/firmware code 630, including instructions that, when executed, cause the processor 620 to perform various functions described herein (e.g., facilitating multitenant directory management.). Alternatively, the software/firmware code 630 may not be directly executable by the processor 620 but cause a computer (e.g., when compiled and executed) to perform functions described herein. The processor 620 may include an intelligent hardware device, (e.g., a central processing unit (CPU), a microcontroller, an ASIC, etc.)

The components of central server 105-c and edge server 115-f may each, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 7:
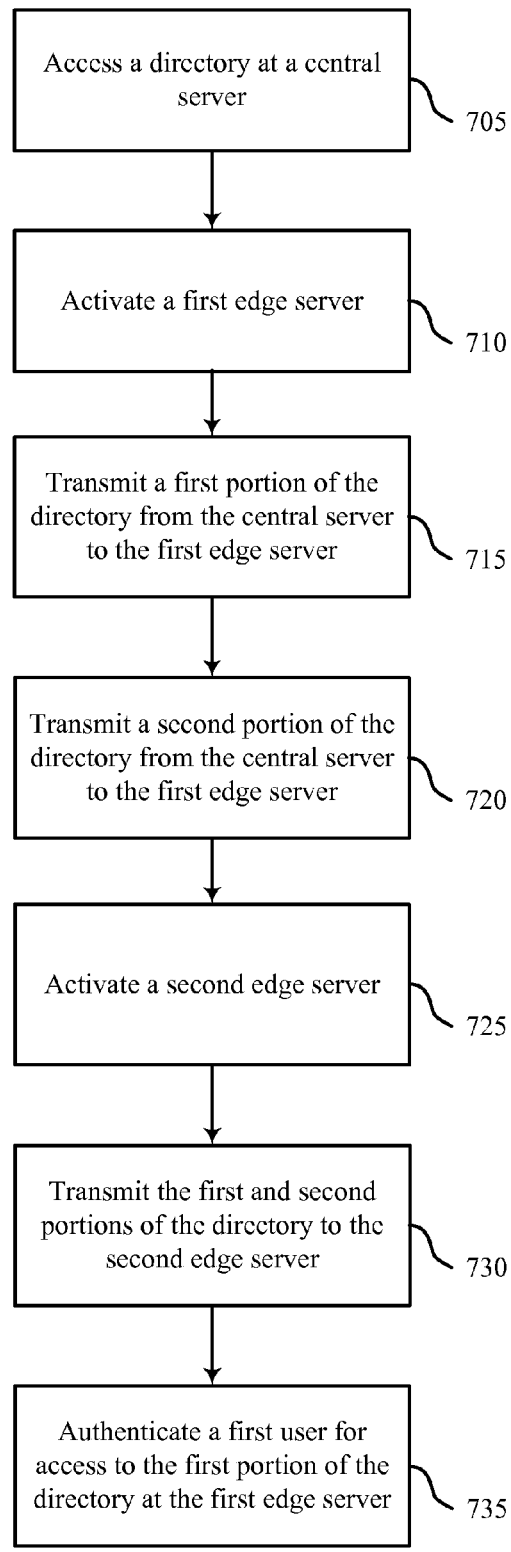
FIGS. 7-10 illustrate methods for multitenant directory management in accordance with various aspects of the present disclosure.

FIG. 7 illustrates a method 700 for multitenant directory management in accordance with various aspects of the present disclosure. The operations of method 700 may be implemented by various servers and devices within a system, as described with reference to FIGS. 1-6. In some examples, one or more servers, such as central server 105, may execute a set of codes to control the functional elements of servers and devices with the system 100 to perform the functions described below. Additionally or alternatively, the central server 105 may perform aspects the functions described below using special-purpose hardware.

At block 705, the central server 105 may access a directory at the central server, where the directory comprises IT resources for a plurality of customers as described with reference to FIGS. 1-4. In certain examples, the operations of block 705 may be performed by the directory server module 205 as described with reference to FIGS. 2 and 5.

At block 710, the central server 105 may activate a first edge server of the plurality of edge servers as described with reference to FIGS. 1-4. In certain examples, the operations of block 710 may be performed by the directory server module 205 as described with reference to FIG. 5.

At block 715, the central server 105 may transmit a first portion of the directory from the central server to the first edge server, where the first portion of the directory includes IT resources for a first customer of the plurality of customers as described with reference to FIGS. 1-4. In certain examples, the operations of block 715 may be performed by the directory server module 205 or network communications module 535 as described with reference to FIG. 5.

At block 720, the central server 105 may transmit a second portion of the directory from the central server to the first edge server, where the second portion of the directory comprises IT resources for a second customer of the plurality of customers as described with reference to FIGS. 1-4. In certain examples, the operations of block 720 may be performed by the directory server module 205 or network communications module 535 as described with reference to FIG. 5.

At block 725, the central server 105 may activate a second edge server of the plurality of edge servers based at least in part on a system load from the plurality of customers as described with reference to FIGS. 1-4. In certain examples, the operations of block 725 may be performed by the directory server module 205 or network communications module 535 as described with reference to FIG. 5.

At block 730, the central server 105 may transmit the first and second portions of the directory to the second edge server as described in FIGS. 1-4. In certain examples, the operations of block 730 may be performed by the directory server module 205 or network communications module 535 as described with reference to FIG. 5.

At block 735, the central server 105 or one or more edge servers 115 may authenticate a first user for access to the first portion of the directory at the first and second edge servers utilizing a first protocol as described with reference to FIGS. 1-4. In certain examples, the operations of block 735 may be performed by the directory server module 205 as described with reference to FIG. 5.

Figure 8:
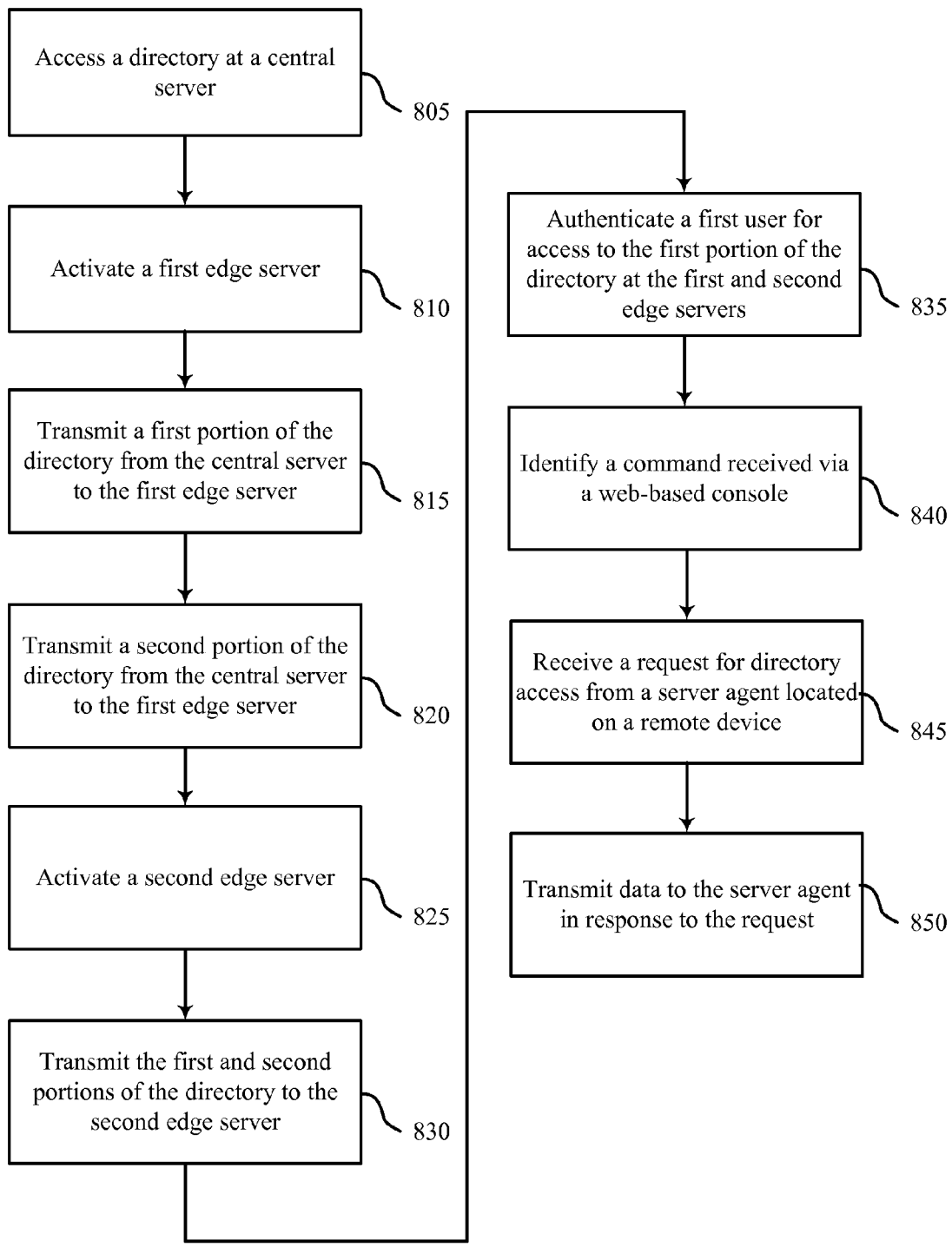

FIG. 8 illustrates a method 800 for multitenant directory management in accordance with various aspects of the present disclosure. The operations of method 800 may be implemented by various servers and devices within a system, as described with reference to FIGS. 1-6. In some examples, one or more servers, such as central server 105, may execute a set of codes to control the functional elements of servers and devices with the system 100 to perform the functions described below. Additionally or alternatively, the central server 105 may perform aspects the functions described below using special-purpose hardware. The method 800 may also incorporate aspects of method 700 of FIG. 7.

At block 805, the central server 105 may access a directory at the central server, where the directory comprises IT resources for a plurality of customers as described with reference to FIGS. 1-4. In certain examples, the operations of block 805 may be performed by the directory server module 205 as described with reference to FIGS. 2 and 5.

At block 810, the central server 105 may activate a first edge server of the plurality of edge servers as described with reference to FIGS. 1-4. In certain examples, the operations of block 810 may be performed by the directory server module 205 as described with reference to FIG. 5.

At block 815, the central server 105 may transmit a first portion of the directory from the central server to the first edge server, where the first portion of the directory includes IT resources for a first customer of the plurality of customers as described with reference to FIGS. 1-4. In certain examples, the operations of block 815 may be performed by the directory server module 205 or network communications module 535 as described with reference to FIG. 5.

At block 820, the central server 105 may transmit a second portion of the directory from the central server to the first edge server, where the second portion of the directory comprises IT resources for a second customer of the plurality of customers as described with reference to FIGS. 1-4. In certain examples, the operations of block 820 may be performed by the directory server module 205 or network communications module 535 as described with reference to FIG. 5.

At block 825, the central server 105 may activate a second edge server of the plurality of edge servers based at least in part on a system load from the plurality of customers as described with reference to FIGS. 1-4. In certain examples, the operations of block 825 may be performed by the directory server module 205 or network communications module 535 as described with reference to FIG. 5.

At block 830, the central server 105 may transmit the first and second portions of the directory to the second edge server as described in FIGS. 1-4. In certain examples, the operations of block 830 may be performed by the directory server module 205 or network communications module 535 as described with reference to FIG. 5.

At block 835, the central server 105 or one or more edge servers 115 may authenticate a first user for access to the first portion of the directory at the first and second edge servers utilizing a first protocol as described with reference to FIGS. 1-4. In certain examples, the operations of block 835 may be performed by the directory server module 205 as described with reference to FIG. 5.

At block 840, the central server 105 may identify a command received via a web-based console as described with reference to FIGS. 1 and 4. In certain examples, the operations of block 840 may be performed by the console server module 510 as described with reference to FIG. 5.

At block 845, the central server 105 may receive a request for directory access from a server agent located on a remote device as describe with reference to FIGS. 1 and 4. In certain examples, the operations of block 845 may be performed by the agent server module 515 as described with reference to FIG. 5.

At block 850, the central server 105 may transmit data to the server agent in response to the request for directory access based at least in part on the identified command as described with reference to FIGS. 1 and 4. In certain examples, the operations of block 850 may be performed by the agent server module 515 as described with reference to FIG. 5.

Figure 9:
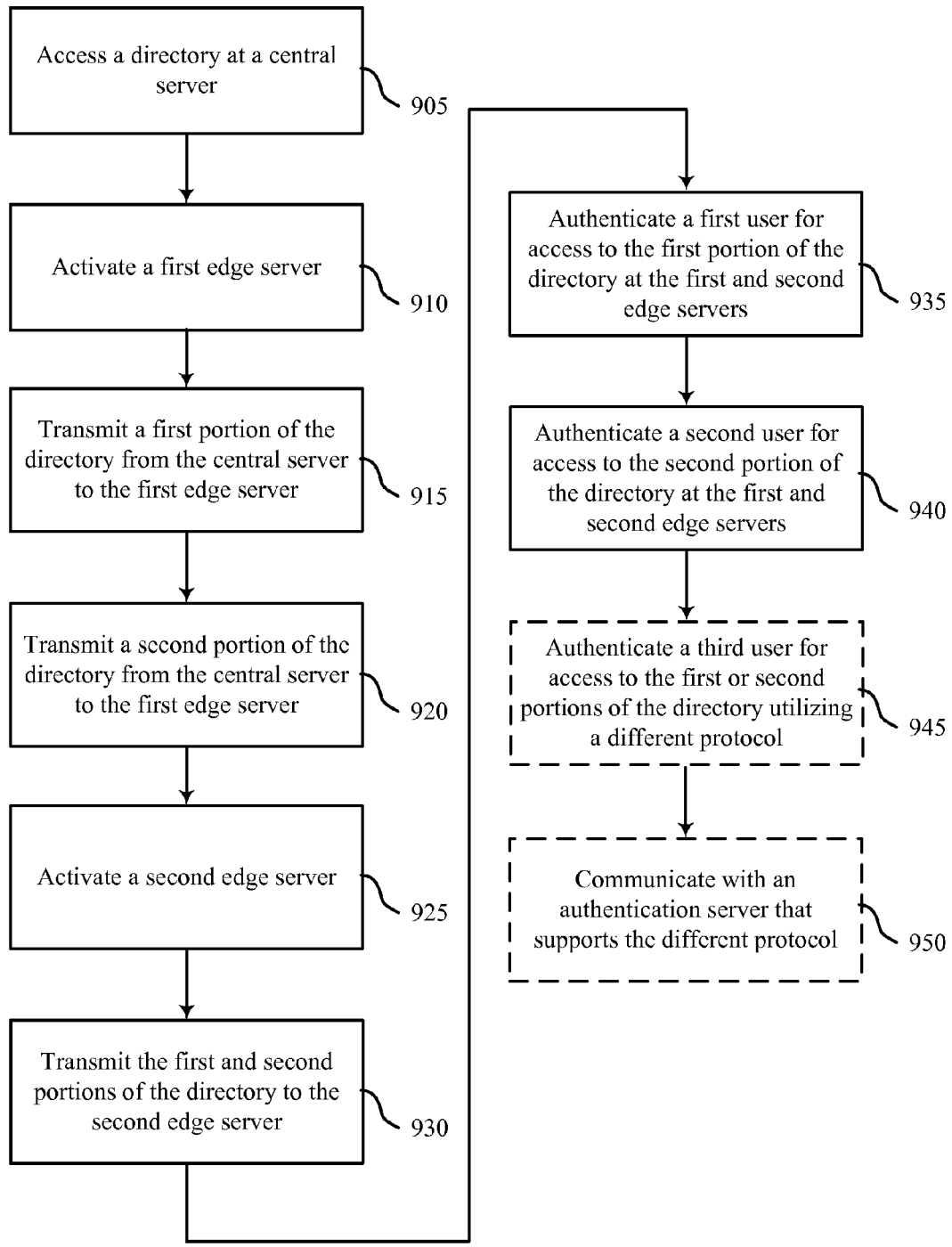

FIG. 9 illustrates a method 900 for multitenant directory management in accordance with various aspects of the present disclosure. The operations of method 900 may be implemented by various servers and devices within a system, as described with reference to FIGS. 1-6. In some examples, one or more servers, such as central server 105, may execute a set of codes to control the functional elements of servers and devices with the system 100 to perform the functions described below. Additionally or alternatively, the central server 105 may perform aspects the functions described below using special-purpose hardware. The method 800 may also incorporate aspects of methods 700 and 800 of FIGS. 7 and 8.

At block 905, the central server 105 may access a directory at the central server, where the directory comprises IT resources for a plurality of customers as described with reference to FIGS. 1-4. In certain examples, the operations of block 905 may be performed by the directory server module 205 as described with reference to FIGS. 2 and 5.

At block 910, the central server 105 may activate a first edge server of the plurality of edge servers as described with reference to FIGS. 1-4. In certain examples, the operations of block 910 may be performed by the directory server module 205 as described with reference to FIG. 5.

At block 915, the central server 105 may transmit a first portion of the directory from the central server to the first edge server, where the first portion of the directory includes IT resources for a first customer of the plurality of customers as described with reference to FIGS. 1-4. In certain examples, the operations of block 915 may be performed by the directory server module 205 or network communications module 535 as described with reference to FIG. 5.

At block 920, the central server 105 may transmit a second portion of the directory from the central server to the first edge server, where the second portion of the directory comprises IT resources for a second customer of the plurality of customers as described with reference to FIGS. 1-4. In certain examples, the operations of block 920 may be performed by the directory server module 205 or network communications module 535 as described with reference to FIG. 5.

At block 925, the central server 105 may activate a second edge server of the plurality of edge servers based at least in part on a system load from the plurality of customers as described with reference to FIGS. 1-4. In certain examples, the operations of block 925 may be performed by the directory server module 205 or network communications module 535 as described with reference to FIG. 5.

At block 930, the central server 105 may transmit the first and second portions of the directory to the second edge server as described in FIGS. 1-4. In certain examples, the operations of block 930 may be performed by the directory server module 205 or network communications module 535 as described with reference to FIG. 5.

At block 935, the central server 105 or one or more edge servers 115 may authenticate a first user for access to the first portion of the directory at the first and second edge servers utilizing a first protocol as described with reference to FIGS. 1-4. In certain examples, the operations of block 935 may be performed by the directory server module 205 as described with reference to FIG. 5.

At block 940, the central server 105 may authenticate a second user for access to the second portion of the directory at the first edge and second edge servers utilizing the first protocol as described with reference to FIGS. 1-4. In certain examples, the operations of block 940 may be performed by the directory server module 205 as described with reference to FIG. 5.

At block 945, the central server 105 or the authentication server 145, or both, may authenticate a third user for access to the first or second portion of the directory utilizing a second protocol that is different from the first protocol as described with reference to FIGS. 1 and 4. In certain examples, the operations of block 945 may be performed by the directory server module 205 as described with reference to FIG. 5.

At block 950, the central server 105 may communicate with an authentication server that supports authentication using the second protocol, where the third user may be authenticated via a request to the authentication server as described with reference to FIGS. 1 and 4. In certain examples, the operations of block 950 may be performed by the network communications module 535 as described with reference to FIG. 5.

Figure 10:
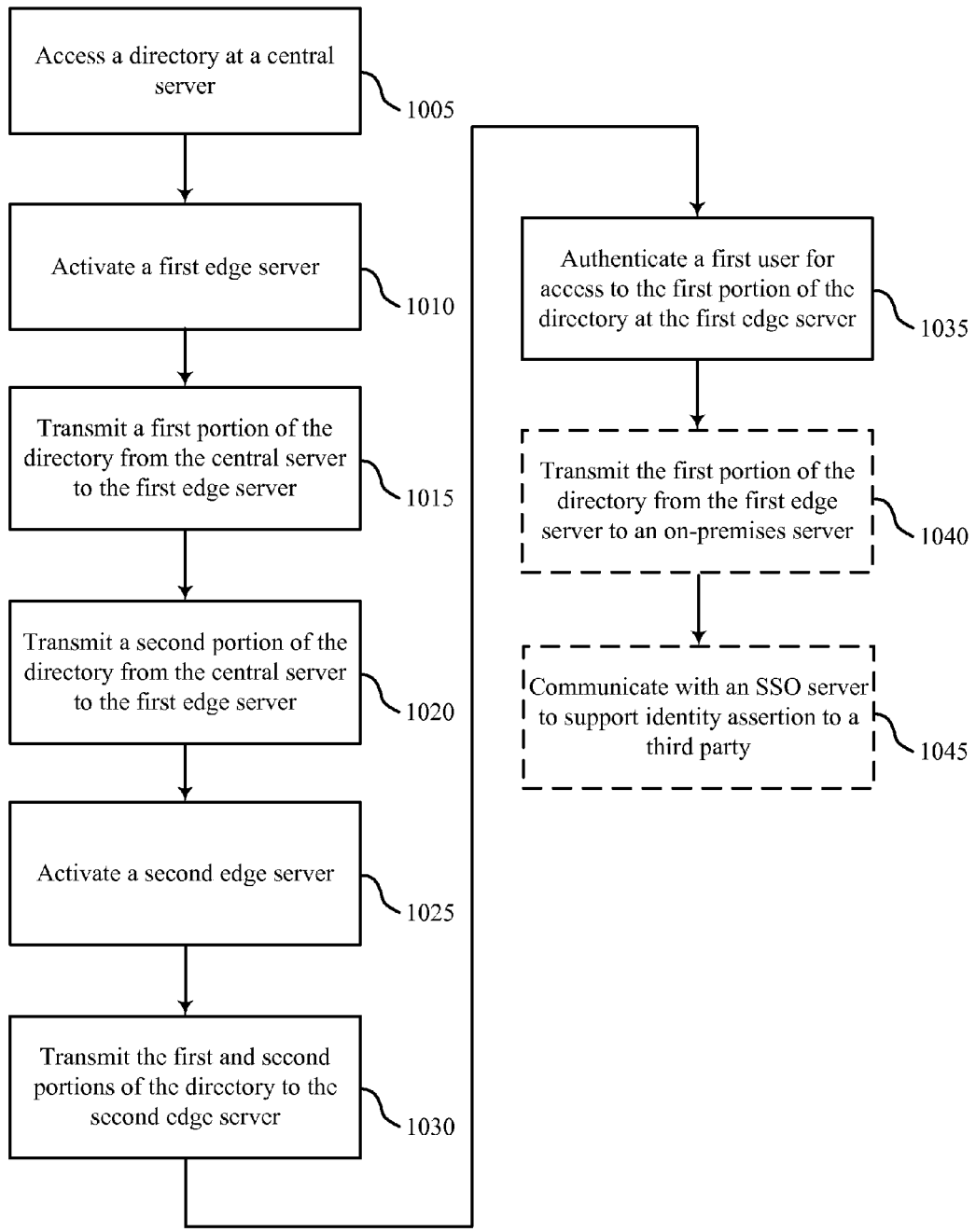

FIG. 10 illustrates a method 1000 for multitenant directory management in accordance with various aspects of the present disclosure. The operations of method 1000 may be implemented by various servers and devices within a system, as described with reference to FIGS. 1-6. In some examples, one or more servers, such as central server 105, may execute a set of codes to control the functional elements of servers and devices with the system 100 to perform the functions described below. Additionally or alternatively, the central server 105 may perform aspects the functions described below using special-purpose hardware. The method 800 may also incorporate aspects of methods 700, 800, and 900 of FIGS. 7, 8, and 9.

At block 1005, the central server 105 may access a directory at the central server, where the directory comprises IT resources for a plurality of customers as described with reference to FIGS. 1-4. In certain examples, the operations of block 1005 may be performed by the directory server module 205 as described with reference to FIGS. 2 and 5.

At block 1010, the central server 105 may activate a first edge server of the plurality of edge servers as described with reference to FIGS. 1-4. In certain examples, the operations of block 1010 may be performed by the directory server module 205 as described with reference to FIG. 5.

At block 1015, the central server 105 may transmit a first portion of the directory from the central server to the first edge server, where the first portion of the directory includes IT resources for a first customer of the plurality of customers as described with reference to FIGS. 1-4. In certain examples, the operations of block 1015 may be performed by the directory server module 205 or network communications module 535 as described with reference to FIG. 5.

At block 1020, the central server 105 may transmit a second portion of the directory from the central server to the first edge server, where the second portion of the directory comprises IT resources for a second customer of the plurality of customers as described with reference to FIGS. 1-4. In certain examples, the operations of block 1020 may be performed by the directory server module 205 or network communications module 535 as described with reference to FIG. 5.

At block 1025, the central server 105 may activate a second edge server of the plurality of edge servers based at least in part on a system load from the plurality of customers as described with reference to FIGS. 1-4. In certain examples, the operations of block 1025 may be performed by the directory server module 205 or network communications module 535 as described with reference to FIG. 5.

At block 1030, the central server 105 may transmit the first and second portions of the directory to the second edge server as described in FIGS. 1-4. In certain examples, the operations of block 1030 may be performed by the directory server module 205 or network communications module 535 as described with reference to FIG. 5.

At block 1035, the central server 105 or one or more edge servers 115 may authenticate a first user for access to the first portion of the directory at the first and second edge servers utilizing a first protocol as described with reference to FIGS. 1-4. In certain examples, the operations of block 1035 may be performed by the directory server module 205 as described with reference to FIG. 5.

At block 1040, the central server 105 and one or more edge servers 115 may transmit the first portion of the directory from the first edge server to a portion of an on-premises server of the first customer as described in FIGS. 1 and 4. In certain examples, the operations of block 1040 may be performed by the directory server module 205 and the network communications module 535 as described with reference to FIG. 5, or the first customer directory module 605 and the network communications module 635 as describe with reference to FIG. 6.

At block 1045, the central server 105 may communicate with a single-sign-on server to support identity assertion to a third party on behalf of a customer of the plurality of customers as described with reference to FIGS. 1 and 4. The identity assertion may be based at least in part on the single-sign-on server accessing the directory. In certain examples, the operations of block 1040 may be performed by the directory server module 205 and the network communications module 535 as described with reference to FIG. 5.

Thus, methods 700, 800, 900 and 1000 may provide for multitenant directory management, which may utilize an integrated hosted directory. It should be noted that methods 700, 800, 900 and 1000 describe possible implementations, and that the operations and the steps may be rearranged or otherwise modified such that other implementations are possible. In some examples, aspects from two or more of the methods 700, 800, 900 and 1000 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of multitenant directory management within a networked computing system comprising a central server and a plurality of edge servers, the method comprising:
accessing a multitenant directory at the central server, wherein the multitenant directory comprises a mapping between user identities and information technology (IT) resources for a plurality of organizations, and wherein each organization of the plurality of organizations comprises a plurality of users, wherein the IT resources for at least one organization of the plurality of organizations includes file systems;
activating a first edge server of the plurality of edge servers;
transmitting a first portion of the multitenant directory from the central server to the first edge server, wherein the first portion of the multitenant directory comprises references to IT resources for a first organization of the plurality of organizations;
transmitting a second portion of the multitenant directory from the central server to the first edge server, wherein the second portion of the multitenant directory comprises references to IT resources for a second organization of the plurality of organizations;
activating a second edge server of the plurality of edge servers based at least in part on a system load from the plurality of organizations;
transmitting the first and second portions of the multitenant directory to the second edge server; and
authenticating a first user of the first organization of the plurality of organizations for access to the first portion of the multitenant directory at the first and second edge servers utilizing a first protocol, wherein the authenticating is based at least in part on the first user of the first organization being assigned a permission, and wherein the authenticating comprises:
providing an indication to one or more of the IT resources that the first user of the first organization is assigned the permission.

2. The method of claim 1, further comprising:
authenticating a first user of a second organization of the plurality of organizations for access to the second portion of the multitenant directory at the first and second edge servers utilizing the first protocol.

3. The method of claim 2, further comprising:
authenticating a second user of the first organization for access to the first portion of the multitenant directory utilizing a second protocol that is different from the first protocol.

4. The method of claim 3, further comprising:
communicating with an authentication server that supports authentication using the second protocol, wherein the second user of the first organization is authenticated via a request to the authentication server.

5. The method of claim 4, wherein each edge server of the plurality of edge servers support access to the multitenant directory using the first protocol.

6. The method of claim 5, wherein the first protocol comprises Lightweight Directory Access Protocol (LDAP) and the second protocol comprises Kerberos.

7. The method of claim 1, further comprising:
identifying a command received via a web-based console;
receiving a request for directory access from a server agent located on a remote device; and
transmitting data to the server agent in response to the request for directory access based at least in part on the identified command.

8. The method of claim 1, further comprising:
transmitting the first portion of the multitenant directory from the first edge server to a portion of an on-premises server of the first organization.

9. The method of claim 8, wherein the portion of the on-premises server comprises an LDAP sync replica.

10. The method of claim 1, further comprising:
communicating with a single-sign-on server to support identity assertion to a third party on behalf of at least one organization of the plurality of organizations, wherein the identity assertion is based at least in part on the single-sign-on server accessing the multitenant directory, and wherein the single-sign-on server utilizes at least one of Security Assertion Markup Language (SAML), OpenID, or OAuth.

11. A system for multitenant directory management, comprising:
a central server comprising:
a multitenant directory that comprises a mapping between user identities and information technology (IT) resources for a plurality of organizations, wherein each organization of the plurality of organizations comprises a plurality of users, wherein the IT resources for at least one organization of the plurality of organizations includes file systems;
a directory server that supports access to the multitenant directory using a first protocol;
a console server in electronic communication with the directory server, wherein the console server provides a user interface for web-based access to the multitenant directory; and
an agent server in electronic communication with the directory server and the console server, wherein the agent server controls server agents located on remote devices and supports agent access to the multitenant directory;
a first edge server in electronic communication with the directory server, wherein the first edge server supports access to the multitenant directory using the first protocol, and wherein the first edge server hosts a first portion of the multitenant directory for a first organization of the plurality of organizations and a second portion of the multitenant directory for a second organization of the plurality of organizations;
a second edge server in electronic communication with the directory server and operable to activate if a system load from the plurality of organizations is greater than a first threshold and to deactivate if the system load from the plurality of organizations is less than a second threshold, wherein the second edge server supports access to the multitenant directory using the first protocol, and wherein the second edge server hosts the first portion of the multitenant directory for the first organization or the second portion of the multitenant directory for the second organization, or both; and
an authentication server in electronic communication with the central server, wherein the authentication server authenticates users from the plurality of organizations for access to the first or second portions of the multitenant directory using a second protocol that is different from the first protocol, wherein the authentication server is based at least in part on the first user of the first organization being assigned a permission, and wherein the authentication server:
provides an indication to one or more of the IT resources that the first user of the first organization is assigned the permission.

12. The system of claim 11, further comprising:
a single-sign-on server in electronic communication with the multitenant directory, wherein the single-sign-on server is operable to assert a user's identity to a third party using a third protocol and based at least in part on accessing the multitenant directory.

13. The system of claim 12, wherein the third protocol comprises Security Assertion Markup Language (SAML), OpenID, or OAuth.

14. The system of claim 11, further comprising:
a first replica module at an on-premises server of the first organization and in electronic communication with the first edge server, wherein the first replica module hosts the first portion of the multitenant directory, and wherein the first replica module supports access to the multitenant directory using the first protocol.

15. The system of claim 14, further comprising:
a second replica module at an on-premises server of the second organization and in electronic communication with the first edge server, wherein the second replica module hosts the second portion of the multitenant directory, and wherein the second replica module supports access to the multitenant directory using the first protocol.

16. The system of claim 11, further comprising:
a remote authentication server in electronic communication with the first edge server, wherein the remote authentication server authenticates guest users or virtual private network users, or both, for access to the first portion of the multitenant directory.

17. The system of claim 11, further comprising:
a server agent in communication with the agent server and located on a device of a user of the plurality of organizations.

18. The system of claim 11, wherein the console server is accessible to at least one organization of the plurality of organizations with a representational state transfer (REST) application programming interface (API).

19. The system of claim 11, wherein the first protocol comprises LDAP and the second protocol comprises Kerberos.

20. A central server for multitenant directory management within a networked computing system, comprising:
a processor;
memory in electronic communication with the processor; and
instructions stored in the memory and operable when executed by the processor to cause the central server to:
access a multitenant directory at the central server, wherein the multitenant directory comprises a mapping between user identities and information technology (IT) resources for a plurality of organizations, wherein each organization of the plurality of organizations comprises a plurality of users, wherein the IT resources for at least one organization of the plurality of organizations includes file systems;
transmit a first portion of the multitenant directory to a first edge server, wherein the first portion of the multitenant directory comprises references to IT resources for a first organization of the plurality of organizations;
transmit a second portion of the multitenant directory to the first edge server, wherein the second portion of the multitenant directory comprises references to IT resources for a second organization of the plurality of organizations;
transmit the first portion or second portion of the multitenant directory to a second edge server, wherein the second edge server is operable to activate if a system load from the plurality of organizations is greater than a first threshold and to deactivate if the system load from the plurality of organizations is less than a second threshold;
authenticate a first user of the first organization of the plurality of organizations for access to the first portion of the multitenant directory at the first or second edge server base at least in part on a request received from the first or second edge server, wherein the authentication is based at least in part on the first user of the first organization being assigned a permission, and wherein the authentication comprises:
providing an indication to one or more of the IT resources that the first user of the first organization is assigned the permission; and
authenticate a first user of a second organization of the plurality of organizations for access to the second portion of the multitenant directory at the first edge server based at least in part on a request received from the first edge server, wherein the authentication is based at least in part on the first user of the second organization being assigned a permission, and wherein the authentication comprises:
providing an indication to one or more of the IT resources that the first user of the second organization is assigned the permission.

* * * * *